Oct. 27, 1964  C. T. HUTCHENS  3,154,318
HYDRO-PNEUMATIC SUSPENSION SYSTEM FOR VEHICLE
Filed April 24, 1962  3 Sheets—Sheet 3
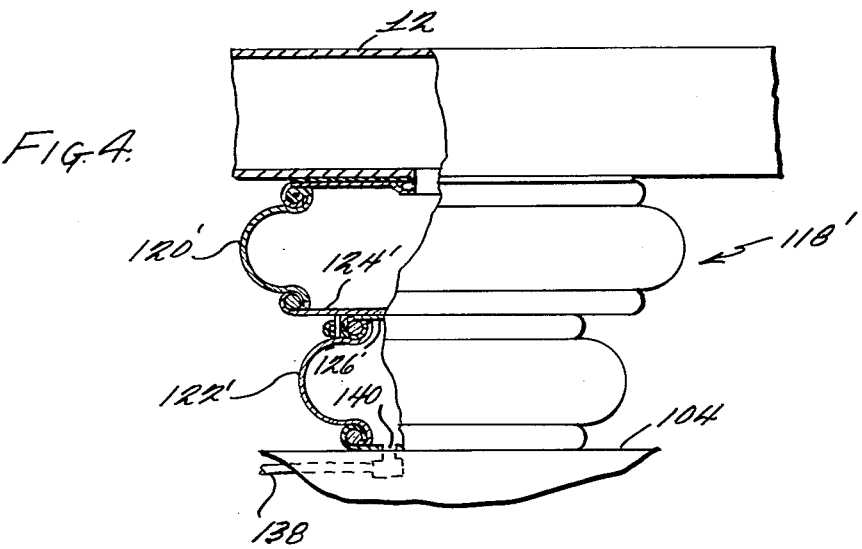
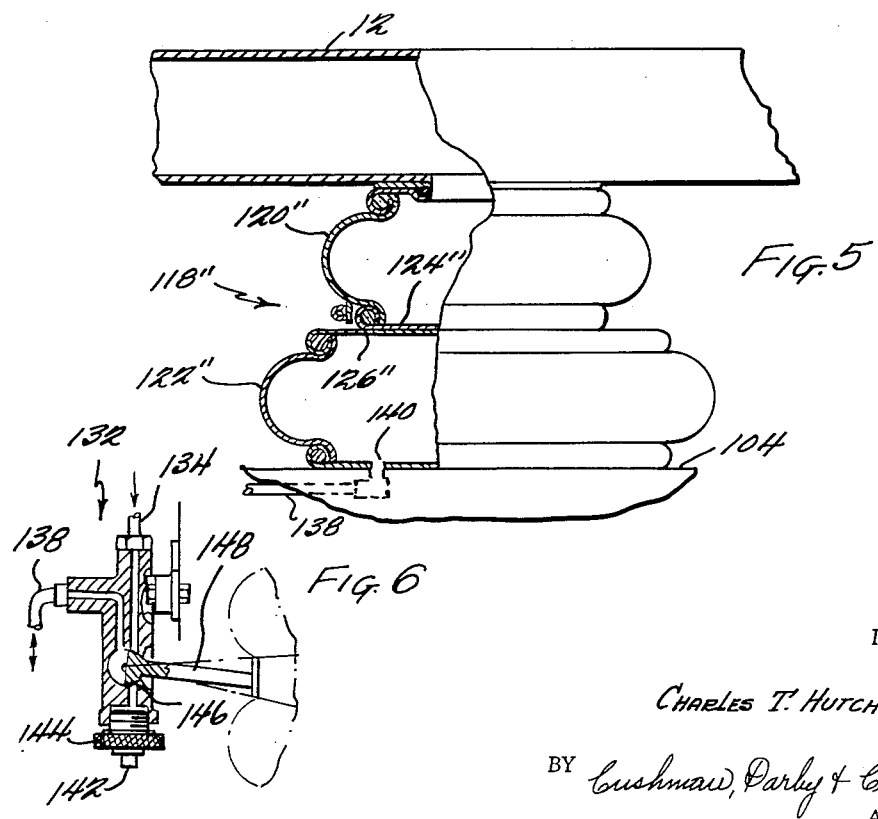
INVENTOR
CHARLES T. HUTCHENS
BY Cushman, Darby & Cushman
ATTORNEYS

United States Patent Office 3,154,318
Patented Oct. 27, 1964

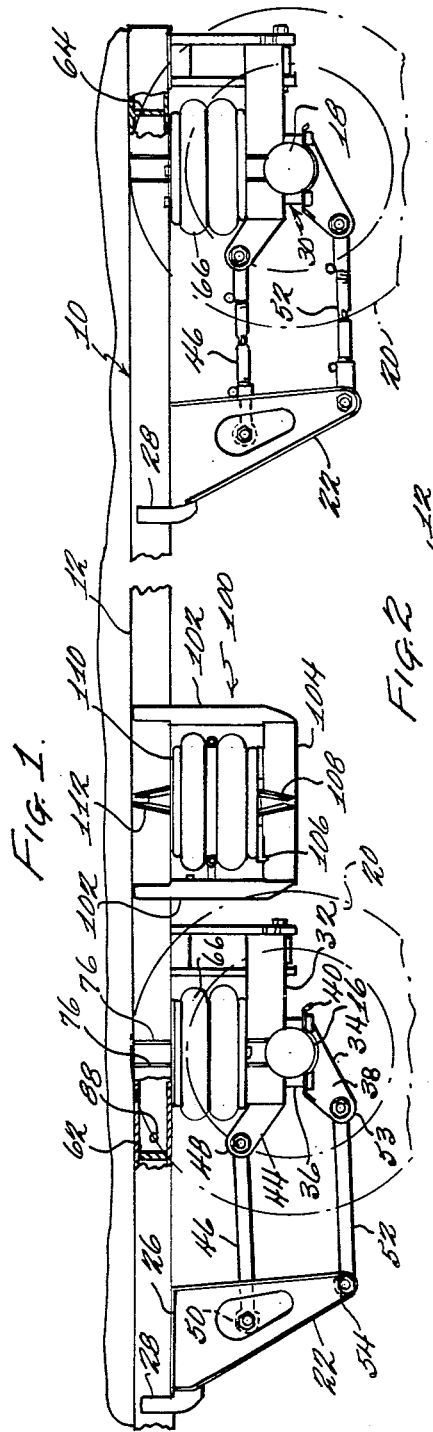

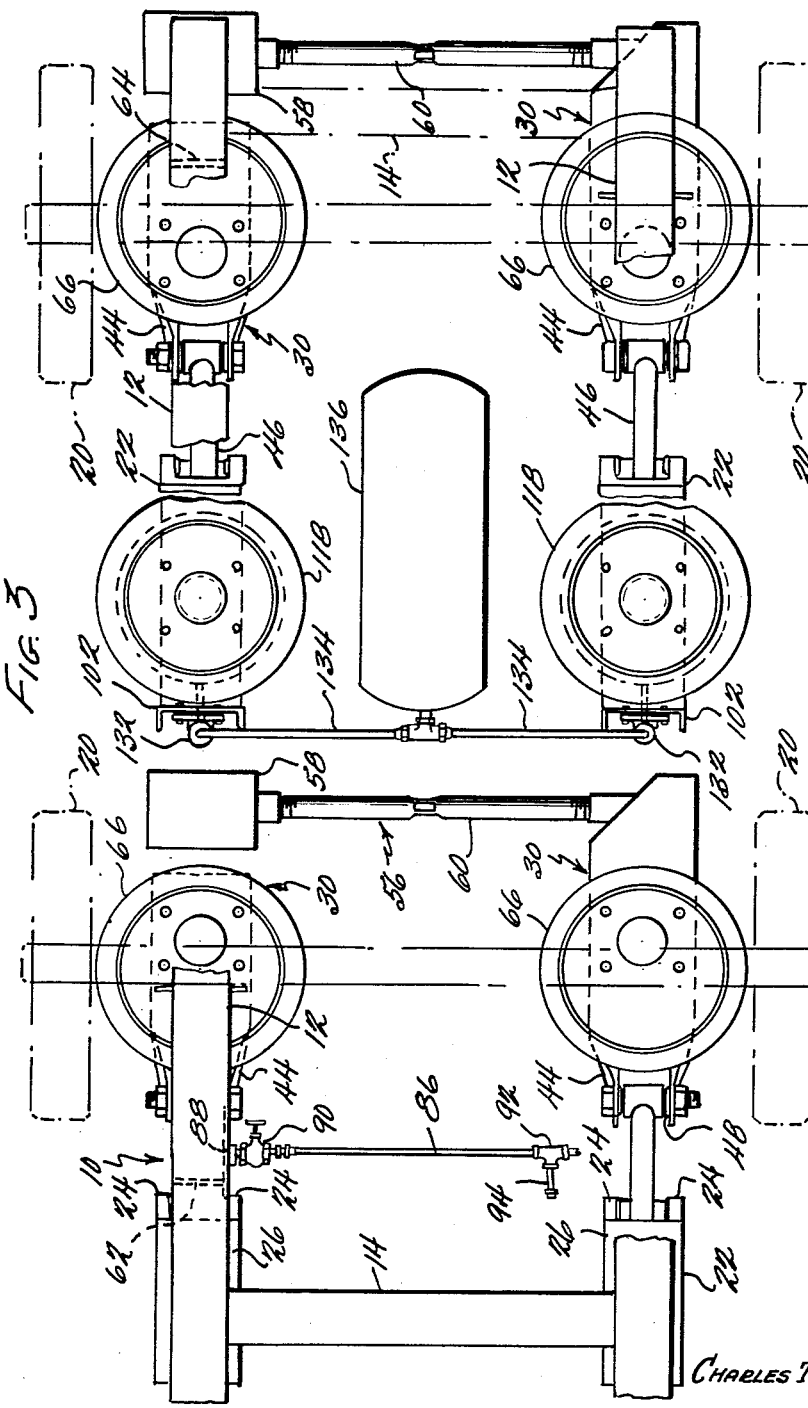

3,154,318
HYDRO-PNEUMATIC SUSPENSION SYSTEM
FOR VEHICLE
Charles T. Hutchens, P.O. Box 1355, South Side Station,
Springfield, Mo.
Filed Apr. 24, 1962, Ser. No. 189,773
15 Claims. (Cl. 280—104)

The present invention relates to a vehicle suspension system and, more particularly, to an improved type of hydro-pneumatic suspension system especially adapted for utilization in tandem axle trailers and the like.

For sometime, it has been proposed to replace conventional load bearing springs of vehicle suspension systems with fluid receiving bellows positioned between the axles and the vehicle frame or subframe as the case may be. The presently available bellows are usually arranged to receive compressed air and are used primarily to absorb shock loads imposed on the vehicle axles by the wheels striking an object in the road or falling into a depression. While these systems have in some instances provided a satisfactory operation in giving the vehicle an air ride, they have been quite expensive and required somewhat elaborate equipment which added considerably to the weight of the vehicle. In addition, such prior systems have required considerable maintenance in use as they require constant servicing of the pneumatic system in order to insure proper suspensions of the vehicle. Further, such air systems did not provide for satisfactory equalizing of loads on tandem axle vehicles when unequal loads were imposed on the axles by the contour of the road surface.

In my prior United States Patent 2,907,576 issue October 6, 1959, there is disclosed a hydro-pneumatic suspension system which is substantially adapted to be employed in tandem axel type trailers. In the system disclosed in my aforementioned patent, provisions are made for equalizing the load on the tandem axles of a vehicle when the vehicle encounters a road contour which would necessarily impose an unequal load in the absence of such a system. A hydraulic bellows is incorporated between the vehicle frame and each axle, the associated hydraulic bellows on one side of the frame being in fluid communication with each other so that compression of one bellows will cause expansion of the other bellows. In order that the incompressible fluid in the system can be cushioned upon dynamic shock loads, a pressure chamber is provided between each associated bellows, the pressure chamber having a diaphragm therein for absorbing sudden pressure changes in the system. The present invention provides an improvement of my prior system as well as the known commercial pneumatic suspension systems in that it operates in a more efficient manner and is considerably less costly in manufacture, installation and maintenance after installation on the vehicle. The system of the present invention has further advantages over my prior system in that it provides for a more stabilized attitude of the vehicle frame with respect to the vehicle axles regardless of load conditions imposed either statically or dynamically.

Although the system of the present invention will be described in use with a tandem axle vehicle such as a trailer or the like having a fifth wheel for attachment to a tractor, it may be used on all types of six-wheel motor vehicles or it may be used on trailer type vehicles wherein at least one of the axles of the vehicle is steerable as disclosed in my aforementioned patent.

Accordingly, an object of the present invention is to provide an improved type of hydro-pneumatic suspension system which is simple in construction but highly effective in operation, economical to manufacture and maintain and light weight in construction.

A further object of the present invention is to provide a hydro-pneumatic suspension system for a vehicle which will absorb dynamic shock loads imposed upon the vehicle axle and coupled with the above provide means for equalizing any unequal loads imposed as well as return the axle to a predetermined position with respect to the frame of the vehicle.

Still another object of the present invention is the provision of an improved hydro-pneumatic suspension system in which the vehicle frame is supported on the axles by load bearing hydraulic bellows, and which includes an accumulator having means responsive to change in load conditions causing changes of pressure in the load bearing bellows for opposing such pressure changes so that pressure on the axles is equalized.

Ancillary to the preceding object, it is a further object of the present invention to provide a hydro-pneumatic suspension system which incorporates means effectively responsive to changes of pressure within the system to oppose the pressure changes and return the system to a predetermined static condition.

These and other objects and advantages of the present invention will appear more fully in the following specification, claims and drawings in which:

FIGURE 1 is a side elevational view partly in section and illustrating a system embodying the principles of the present invention, only a portion of the vehicle being shown for the purposes of clarity;

FIGURE 2 is an enlarged fragmentary side elevational view partly in section and illustrating the system of the present invention;

FIGURE 3 is a top plan view of FIGURE 1, parts being broken away and other parts being shown in phantom lines;

FIGURE 4 is a fragmentary view of a modified bellows structure for the accumulator means;

FIGURE 5 is a further modification of the bellows structure for the accumulator means; and FIGURE 6 is an enlarged fragmentary vertical sectional view of the valve mechanism shown in FIGURE 2 which is associated with the accumulator means.

Referring now to the drawings wherein like character and reference numerals represent like or similar parts, the suspension system of the present invention is illustrated as applied to a frame of a vehicle generally designated at 10. While the frame 10 may be a permanent part of the vehicle body as shown, it may also be a subframe which is fixedly attached to the vehicle body. Therefore, frame as used in the specification and claims is intended to cover both a frame forming a permanent part of a vehicle body or a subframe fixedly attached to the vehicle body as is well known in the art. The frame 10, as illustrated, is on a vehicle body of the trailer type having independently suspended tandem axles. It is, of course, within the scope of the present invention that the system has general application to suspensions of other types of vehicle and is not specifically limited to arrangement of a tandem axle suspension. As mentioned above, the system may be readily embodied in any six-wheel motor vehicle or in a steerable tandem axle suspension arrangement as disclosed in my aforementioned United States Patent 2,907,576.

Frame 10 is of any suitable construction and as best shown in FIGURE 3 includes a pair of longitudinally extending side frame members 12, preferably of box or tubular construction at least in the area of the suspension system embodying the principles of the present invention. Suitable cross bracing 14 may extend transversely between the side frame members 12 so that the frame has the proper rigidity.

Referring now to FIGURES 1 and 3, the suspension system of the present invention includes forward and rearward axles 16 and 18 respectively disposed in tandem arrangement and extending beneath and transversely of the frame 10. Each axle 16 and 18 has mounted at opposite ends thereof suitable wheels 20 shown in phantom or broken lines. Since the axles 16 and 18 are operatively supported from the vehicle frame 10 in substantially an identical manner, the description of the mounting of one end portion of one axle will suffice for the end portions of the other axles except where there is differences, such differences being described in detail when necessary.

Rigidly secured to each longitudinal side frame member 12 and depending downwardly therefrom is a hanger bracket 22. Each hanger bracket 22 includes a pair of generally triangular plates 24 rigidly interconnected by their upper ends by a flat rectangular plate 26. Suitable sleeve members may extend transversely between the plates 26 to give added rigidity thereto. The bracket 22 is welded to the bottom of the side frame members 12 around the top plate 26 and additional angles or strap members 28 may be between the sides of the frame members 12 and plates 24 to add to the rigidity of the bracket assembly. As will be apparent from FIGURE 3, one bracket 22 on one side of the frame 10 is directly opposite another bracket 22 on the other side of the frame and spaced longitudinally beneath the frame 10 from such a pair of brackets 22 is another pair of brackets 22. While the brackets 22 are preferably welded to the side frame members 10, they could also be rigidly secured in any other manner such as by rivets, bolts or clamps.

Each of the axles 14 and 16 is secured adjacent its opposite end portions by clamp arrangements generally indicated at 30. It will suffice for the presnt purposes to say that the clamp arrangement 30 includes an upper bracket member 32 and a lower cooperating bracket member 34. Each bracket member 32 and 34 is provided with an axle seating surface for respectively receiving the upper and lower portion of the axle and suitable bolts 36 extending through the two brackets are adapted to fixedly hold the bracket members together as the clamp 30 on the axle.

Lower bracket 34 is preferably made of a pair of spaced vertical side plates 38 (one shown) rigidly secured to and depending downwardly from an axle receiving plate 40. Upper bracket member 32 is box-shaped in configuration with the bottom being opened and provided with cutout portions for receiving the upper portion of the axle. The upper bracket 32 is provided at its forward end with a bifurcated member or extension 44.

An upper stabilizing or torque bar 46 is pivotally supported at one end on a conventional rubber bushing 48 carried between the bifurcated extension 44. The other end of the stabilizing bar 46 is pivotally supported on a conventional rubber bushing 50 carried between the plates 24 of the bracket 22. A lower stabilizing or torque bar 52 as best shown in FIGURE 1 is pivotally supported at one end on a conventional type of rubber bushing 53 carried between the plates 36 of lower bracket 34. The other end of the stabilizing bar 52 is pivotally supported between the plates 24 of bracket 22 on a conventional rubber bushing 54. It will be noted that the forward pivot point of the stabilizing bar 46 is slightly forward and above the forward pivot point for the stabilizing bar 52 whereas the rear pivot point for the stabilizing bar 46 is also above and slightly forward of the pivot point for the lower stabilizing bar 52. As will now be apparent, especially from the illustration of FIGURE 1, the stabilizing bars 46 and 52 together with the bracket 22 and clamping means 30 form a parallelogram linkage for supporting the outer end portions of the axles 16 and 18. Such a linkage arrangement provides for a restricted movement of the axle with respect to the frame, the movement being purely a vertical translational movement with respect to the frame. While the preferred form of support for the axles 16 and 18 has been shown as a parallelogram linkage arrangement, it will be apparent that other forms of support of the axle for substantial vertical movement with respect to the frame may be utilized.

As schematically shown in FIGURES 1 and 3, each of the axles 16 and 18 is provided with a sway bar assembly 56 for positively preventing lateral displacement of the axles with respect to the frame. In more detail, each sway bar assembly 56 includes a bracket 58 depending downwardly from one side frame member 12. A bar 60 is pivotally secured at one of its ends to the bracket 58 on a substantially horizontal axis transverse to the longitudinal axis of axle of the vehicle. The other end of the bar 60 is pivotally secured to the upper bracket member 32 which is disposed on the opposite side of the frame 10. Such an arrangement prevents lateral displacement of the axle with respect to the vehicle frame 10 when one of the wheels 20 goes over a bump or depression in the road or when the vehicle is traveling on a road surface which is not level or on a curve in the road.

As heretofore mentioned, the side frame members 12 are preferably of box or tubular construction in the area of the axles of the vehicle. By providing transverse spaced plates or baffles 62 and 64 as shown in FIGURES 1 and 3 within the side frame members 12, the side frame members define a reservoir or fluid connecting means for the suspension system to be subsequently described. While the fluid connecting means has been shown in its preferred form as utilizing the side frame members 12, it will be understood that a suitable conduit could be attached to each side frame member 12 and extend for the length between the axles 16 and 18. The use of a flexible conduit would be desirable in a situation where the vehicle suspension system of the present invention is utilized with a six-wheel motor vehicle or with a trailer having at least one steerable axle arrangement.

Vertical movement of each of the axles 16 and 18 with respect to the frame 10 is controlled by a plurality of hydraulic bellows 66 mounted between the axles and the frame. In more detail, one bellows 66 is positioned between each end portion of an axle and each side frame member 12 so that there are two bellows for each axle and four bellows in all. The bellows 66 is of conventional construction and as shown include two convolutions with an upper rigid end member 68 and a lower rigid end member 70. Any desired number of convolutions may be used depending upon the type of operation which the vehicle is to undergo and the desired amount of movement of the wheels with respect to the vehicle. As best shown in FIGURE 2, the upper rigid end portion 68 of the bellows 66 is provided with an inwardly flared aperture 72 and is connected to the lower side of a flat plate 74 rigidly supported beneath the side frame members 12. Each plate 74 is preferably welded to the underside of the side frame member 12 and is given further rigidity by the triangle shaped braces 76 welded to the same and to the side walls of the frame member 12. Plate 74 is provided with an aperture 78 which aligns with an aperture 80 in the lower side of the frame member 12. A suitable O-ring gasket 82 positioned between the plate 74 and the inwardly offset aperture 72 of the upper rigid end portion 68 of the bellows 66 provides a seal for the hydraulic fluid. The lower end portion 70 is solid in construction and is suitably supported on a horizontal plate 84 forming the top portion of the box-like upper bracket 32.

As is now apparent, the bellows 66 for the front axle 16 on one side of the frame 10 is in open communication with the bellows structure 66 for the rear axle 18 on the same side of the frame. The communication between the two bellows 66 is provided through the side frame member 12 immediately above the same in the closed-off portion between the baffles or plates 62 and 64.

In order to fill the system with hydraulic fluid, a conduit 86 (FIGURE 3) extends between the two side members and opens to the interior of the same as at 88 between the baffles 62 and 64. The conduit 86, adjacent each of its openings 88 into each of the side frame members 12 is provided with shut-off valves 90 (one shown) and intermediate the shut-off valves 90 is a T-fitting 92 having a capped extension 94 through which hydraulic fluid may be supplied. When it is desired to fill one side frame member 12 and its respective bellows 66, the valve 90 adjacent that side frame member is opened and fluid is passed through the extension 94, conduit 86 into the system on that particular side of the frame 10. The other side may be serviced in an identical manner.

A pair of cradle structures 100 are positioned on opposite sides of the frame 10 and depend downwardly from the respective side frame members 12. Each cradle structure 100 includes a pair of channel-shaped members 102 welded to the frame member 12 in spaced relationship to each other and depending downwardly therefrom. The lower ends of the channel-shaped members 102 are connected together by a longitudinally extending member 104 which supports a horizontal flat plate member 106. In more detail, the plate member 106 is supported by brackets 108 welded to the member 104. Immediately above the plate member 106 and rigidly secured to the lower side of the side frame member 12 is a correspondingly shaped plate member 110. The member 110 is welded to the underneath side of frame members 12 and suitable braces or brackets 112 may be provided to give the plate more rigidity. Plate 110 is provided with an aperture 114 which is aligned with an aperture 116 in the lower surface of the side frame 12.

Interposed between the spaced plate member 110 and plate member 106, is a bellows structure generally designated at 118. The bellows structure 118 which provides an accumulator means for the system of the present invention includes an upper bellows 120 and a lower bellows 122. A lower substantially rigid end wall 124 of the upper bellows 120 abuts the upper substantially rigid end wall 126 of the lower bellows 122. A suitable ring clamp 128 may be used to fasten the two bellows 120 and 122 together so that their respective end walls 124 and 126 effectively define a rigid wall extending transversely of the bellows structure and providing an upper and lower chamber. The upper bellows 120 is provided with an inwardly flared aperture 128, in its upper end wall 127, and when the upper end wall is in abutting relationship with the plate 110, the aperture is in alignment with the apertures 114 and 116. A suitable O-ring gasket 130 is positioned between the upper wall 127 and the plate 110 and extends around the aligned apertures so as to provide a hydraulic seal.

A valve mechanism 132 for each of the bellows structures 118 is supported on one of the channel members 102 of each cradle structure 100. As shown in FIGURES 2 and 3, each valve mechanism 132 has extending into the top thereof a line 134 which is in communication with a source of fluid under pressure 136 such as compressed air or the like. The source of fluid under pressure 136 may be the compressor storage tank for the air brake system of the vehicle or it may be a separate tank of compressed air. Each valve 132 has extending from its bottom a line or conduit 138 which is in open communication with the interior of the bellows 122 as indicated at 140. The valve mechanism 132 is also provided with a port to atmosphere 142, the size of which may be controlled by a knurled nut 144. A rotary valve plug 146 (FIGURE 6) carried in the body member of the valve mechanism 132 is adapted to be selectively moved from a position blocking flow of compressed air (as shown in FIGURE 6) to or from the interior of bellows 122 to a position placing the bellows 122 in communication with the source of compressed air and to a second position placing the bellows 122 in communication with atmosphere. Rotary plug 146 is connected to a motion transmission linkage 148 which has its opposite end connected to the clamping ring 128. Upon movement of the bellows 120 as caused by an increase or decrease of pressure therein, it is now obvious that the motion transmission linkage 148 will rotate the rotary valve plug 146 to the various described positions.

The operation of the improved hydropneumatic suspension system of the present invention is as follows:

The hydraulic portion of the system on each side of the vehicle frame 10 is loaded with hydraulic fluid at a predetermined desired pressure through the inlet conduit or line 86 by selectively operating the valves 90. When each side has been filled to capacity with hydraulic fluid, that is, when the chambers of the load carrying bellows 66 and the chamber of the bellows 120 as well as the fluid connecting means defined by the closed off portion of the side frame 12 are completely filled with hydraulic fluid, the hydraulic portion of the system is a completely closed system. In this respect, it will be noted that the pair of bellows 66 on one side of the frame are independent of the bellows 66 on the other side of the frame. Once the hydraulic system has been filled, then compressed air is supplied to each of the bellows 122 from the source of fluid under pressure 136. In the system shown in FIGURES 1 and 2, it is desirable to provide compressed air in the bellows 122, at substantially the same pressure as the pressure of the hydraulic fluid in the bellows 120 when the system is in a static condition, that is, when the vehicle is motionless and unloaded. After the bellows 122 has been filled with compressed air to a proper pressure, the valve mechanism 132 will be in a position such that the rotary plug 146 blocks off the chamber of the bellows 122 from atmosphere and from the source of fluid under pressure 136. In this static condition, the axles of the vehicle are at a predetermined relative position with respect to the frame 10.

When the frame 10 is statically loaded with cargo or personnel, the load on each side of the axles 16 and 18 is increased and both of the hydraulic bellows 66 are compressed, increasing the pressure of the hydraulic fluid therein. Because the hydraulic portion of the system is closed, the only place that the hydraulic fluid can go is into the chamber of the hydraulic bellows 120. The increase of pressure in the hydraulic bellows 120 causes the same to increase in volume against the pressure of air in the pneumatic bellows 122. By increasing volume, the bellows 120 will cause the pressure to increase in the pneumatic chamber of bellows 122 as its volume is correspondingly decreased because of downward movement of the rigid member separating the chambers of bellows 120 and 122. Downward movement of the clamping ring along with the rigid member as defined by the ends 124 and 126 of the bellows 120 and 122 respectively, moves the linkage 148 in a clockwise direction as viewed in FIGURE 2 and such clockwise movement rotates the rotary plug 146 in the valve body to a position where the line 134 from the source of fluid pressure 136 is placed in open communication with the line 138 leading to the inlet 140 of the pneumatic chamber of bellows 122. Compressed air is forced into the bellows 122 further increasing the pressure therein until such time that it equalizes with the increased pressure in the hydraulic chamber of bellows 120. As the pressure increases in bellows 122, the bellows will expand causing a decrease in volume in the hydraulic chamber of bellows 120. The hydraulic fluid is forced outwardly into the fluid connecting means defined by the side frame member 12 back into each of the hydraulic load carrying bellows 66. This will cause the hydraulic load carrying bellows 66 to expand to thereby maintain the frame of the vehicle at a predetermined height with respect to the vehicle axles. It will now be understood that when such a condition occurs, the entire system will be at a stable higher pressure than when the vehicle is in its unloaded condition.

Assuming that an unequal static load is placed in the vehicle body when the vehicle is motionless, the system will operate in substantially the same manner except that because the hydraulic bellows 66 of the front and rear axles are interconnected, the load on the axles may be evenly distributed simultaneously with repositioning of the axles to the predetermined relative position with respect to the vehicle frame.

When the vehicle is unloaded of its cargo or personnel, the reverse of the above operation occurs. In other words, upon removing weight from the vehicle frame, there is less weight on the load carrying bellows 66 and they will expand in volume because of the pressure of the hydraulic fluid therein. However, the pressure of the hydraulic fluid in the bellows 122 will decrease causing the rigid member defined by the ends 124 and 126 to move upwardly toward the frame. The pressure in the pneumatic chamber of bellows 122 in this instance would be greater and would cause such movement but as is now apparent, such movement will cause the linkage 148 to move in a counterclockwise direction which rotates the plug 146 in body of the valve 132 to a position placing the interior of the bellows 122 in communication with atmosphere. Compressed air is bled off of the bellows 122 until such time that the pressure within the bellows 122 is equal to the decrease of pressure within the hydraulic bellows 120 and the rigid member has moved back to its predetermined static position. Movement of the rigid member and the bellows 120 and 122 back to its static position will cause a correspondingly decrease of pressure in the bellows 66 so that the bellows 66 compress until they reach a position where the axles 16 and 18 are at a predetermined relative position with respect to the frame 10.

Assuming the vehicle is in motion and dynamic loads are being imposed upon the wheels 20, the hydro-pneumatic system heretofore described operates in somewhat of a similar manner. If the forward wheel 20 on one side of the vehicle hits a bump in the road, the load carrying bellows 66 associated with such a wheel will be compressed causing hydraulic fluid to flow outwardly of the bellows. If there has been no load change on the rear bellows, the hydraulic fluid under the increased pressure will flow into the chamber of bellows 120 so that the pressure in bellows 120 causes expansion and increase of volume of such bellows, which in turn actuates the valve mechanism 132 to a position wherein pressure is increased within the pneumatic chamber of bellows 122. By this time, the front wheel will probably have passed over the bump and the increasing of the pressure in the pneumatic chamber of the bellows 122 will serve to cause the axle 16 to rapidly assume its normal position relative to the vehicle frame 10.

Upon the occurrence of the reversed condition, that is, when one of the wheels of the vehicle drops into a depression, the load carrying bellows 66 associated with that particular wheel will increase in volume and decrease in pressure and hydraulic fluid from the chamber of bellows 120 will flow out of the same decreasing the pressure therein. Because of the decrease in pressure in chamber 122, there is movement of the rigid member defined by the ends 124 and 126 upwardly toward the vehicle frame 10. This will move the linkage 148 to such a position that the valve 132 bleeds off pressure from the pneumatic chamber so that recovery of position of the axle relative to the frame is quickly accomplished as soon as the wheel is out of the depression.

This operation just described prevents sudden jars from being imposed on the vehicle frame because the assistance of the suspension system takes place as soon as a wheel is down in a depression or up on a rise and there is the immediate reaction to return the particular axle toward the vehicle frame by the corresponding control changing the pressure in the pneumatic chamber 122.

In situations where the vehicle is traveling on the crown or in a gradual depression of a road or on a road having a surface which would necessarily impose unequal loads upon the vehicle frame, the two load carrying bellows 66 on one side of the frame cooperate with the accumulator means defined by the bellows structure 118 to equalize the loads on the axles. Assuming that the vehicle is in such an attitude where an increased load is applied on the forward axle, such load not being a shock or sudden load, the particular bellows 66 for the front axle is compressed whereas the particular bellows 66 for the rear axle is expanded until such time that there is pressure equalization between the loads on front and rear axles. As soon as the road surface has returned to its normal level condition, then the accumulator means coupled with the two bellows 66 operate to change the attitude of the vehicle body to its predetermined desired position, relative the axles.

While the system shown in FIGURES 1, 2 and 3 provides a bellows structure 118 having equal volume in the respective bellows 120 and 122 with an equal area for the pressure of the respective fluids to act, it is preferable that the pressures in the two chambers, namely, the hydraulic chamber and the pneumatic chamber defined by the bellows 120 and 122 respectively be equal when the vehicle is motionless and the valve mechanism is so positioned that there is no flow of air into or out of the pneumatic chamber.

In FIGURE 4, a modification of the bellows structure 118 is disclosed. In this figure, a bellows structure 118' is provided with a hydraulic bellows 120' and a pneumatic bellows 122'. The bellows 120' and 122' are arranged in the cradle 100 in identical manner with the previously described bellows 120 and 122. It will be noted that the lower end surface 124' of bellows 120' has a greater area than the end surface 126' of the bellows 122'. Thus, when the system is charged, the pressures per square inch acting on the areas of the respective end plates 124' and 126' may be different. As an example, the pressure within the bellows 120' may be 80 p.s.i. whereas the pressure within the pneumatic chamber of bellows 122' may be 150 p.s.i.

Referring now to FIGURE 5, a bellows structure 118" is illustrated and includes an upper hydraulic bellows 120" and a lower pneumatic bellows 122". It will be noted that the hydraulic bellows 120" has less volume than the pneumatic bellows 122" and also has an end plate 124" which has less area than the end plate 126". By such an arrangement as shown in FIGURE 5, the system when in a static position, has a greater pressure per square inch in the hydraulic chamber of bellows 120" than in the pneumatic chamber of bellows 120". For example, the pressure of the hydraulic fluid may equal 150 p.s.i. whereas the pressure of the compressed air may only be 80 p.s.i.

When a bellows structure such as shown in FIGURES 4 and 5 is used with the system shown in FIGURES 1 to 3, the operation of the system is substantially identical with the operation as previously described and therefore will not be repeated. The particular bellows structure 118, 118' or 188" used on a vehicle depends on the vehicle's intended use and the amount of desirable response in the system depending on various load conditions expected to be encountered by such a vehicle. In some systems, it is desired to have a fast response while in others a slower response is necessary.

Having set forth the nature, objects and advantages of the present invention, it will now be perceived that certain changes, adjustments and modifications may be made without departing from the principle and spirit of the present invention. Therefore, the terminology used in the specification is for the purpose of description and not limitation, the scope of the invention being defined in the claims.

I claim:

1. In a vehicle, the combination comprising: a vehicle frame; axle means carried by said frame for relative vertical movement with respect thereto; a plurality of hydraulic load carrying bellows operatively connected between said axle means and said frame on each side of said frame; first accumulator means cooperating with the bellows on one side of said frame and second accumulator means cooperating in the bellows on the other side of said frame, each of said accumulator means being provided with means therein dividing the same into a variable volume hydraulic chamber and a variable volume pneumatic chamber, the increase in volume of one of said chambers causing a decrease in volume of the other associated chamber; means communicating each hydraulic chamber with the associated bellows; a source of pressurized gas; and separate control means cooperating with each of said accumulator means and operable in response to a decrease in the volume of the respective hydraulic chamber for releasing pressure from the respective pneumatic chamber and operable in response to an increase in the volume of the respective hydraulic chamber for conducting pressurized gas from said source to the respective pneumatic chamber to thereby oppose a change in the volume of the hydraulic chamber and return the volume of the same to a predetermined volume.

2. The structure defined in claim 1 wherein each control means includes a valve mechanism operatively connected to the respective pneumatic chamber and to said source of gas under pressure, said valve mechanism being movable to a plurality of positions for controlling flow of gas to and from the associated pneumatic chamber; and means for operating said valve mechanism to said plurality of positions.

3. The structure defined in claim 2 wherein the means for operating said valve mechanism includes a motion transmission linkage connected between said valve mechanism and the respective accumulator means and responsive to changes in volume of the hydraulic chamber of the same.

4. The structure defined in claim 1 wherein the hydraulic chamber and pneumatic chamber of each of said accumulator means are in series and wherein each of said accumulator means is operatively supported on said frame structure with the opposite ends of the hydraulic and pneumatic chambers effectively restrained from movement relative one another.

5. The structure defined in claim 1 wherein said means in each of said accumulator means dividing the same into the hydraulic and pneumatic chambers includes a rigid wall extending transverse of the same.

6. The structure of claim 5 further including a cradle structure carried on said frame and having a supporting surface spaced from said frame and wherein at least one of said accumulator means is supported between said supporting surface and said frame, the outer ends of the supported accumulator means being restrained from movement by said frame and by said supporting surface.

7. In a vehicle, the combination comprising: a vehicle frame; at least a pair of axles carried by said frame therebeneath for relative vertical movement with respect thereto; a plurality of hydraulic load carrying bellows on each side of said frame, each bellows being operatively connected between the frame and one of the axles near the end thereof; fluid connecting means between bellows on the same side of the frame, the fluid connecting means of the bellows on one side of the frame being independent of the fluid connecting means for the bellows on the other side of the frame; accumulator means associated with each fluid connecting means, said accumulator means including a variable volume hydraulic chamber in direct communication with its associated fluid connecting means and a variable volume pneumatic chamber, the variable volume hydraulic chamber being operatively connected to the variable volume pneumatic chamber so that a change in volume in one of the chambers results in a change in volume in the other chamber; a source of pressurized gas; and separate control means cooperating with each of said accumulator means and operable in response to a decrease in the volume of the respective hydraulic chamber for releasing pressure from the respective pneumatic chamber and operable in response to an increase in the volume of the respective hydraulic chamber for conducting pressurized gas from said source to the respective pneumatic chamber to thereby oppose a change in the volume of the hydraulic chamber and return the volume of the same to a predetermined volume.

8. The structure defined in claim 7 wherein the accumulator means associated with each of the fluid connecting means is positioned intermediate the associated bellows on the side of the frame.

9. The structure defined in claim 7 including a substantially rigid wall separating the hydraulic and pneumatic chambers of each of said accumulator means.

10. The structure defined in claim 7 wherein the pneumatic and hydraulic chambers of each of said accumulator means are in series and wherein the opposite ends of the associated hydraulic and pneumatic chambers are effectively restrained from movement relative to one another.

11. The structure defined in claim 7 wherein the pneumatic and hydraulic chambers of each of said accumulator means have an equal pressure when in a predetermined static position.

12. The structure defined in claim 7 wherein the hydraulic chamber of each of said accumulator means has less pressure than the associated pneumatic chamber when in a predetermined static position.

13. The structure defined in claim 7 wherein the hydraulic chamber of each of said accumulator means has a greater pressure than the associated pneumatic chamber when in a predetermined static position.

14. The structure defined in claim 7 wherein each control means includes a valve mechanism operatively connected to the respective pneumatic chamber and to said source of gas pressure, said valve mechanism being movable to a plurality of positions for controlling the flow of gas to and from the associated pneumatic chamber; and means for controlling movement of the valve mechanism to a first position blocking flow of gas into and out of the associated pneumatic chamber when the associated hydraulic chamber is at a predetermined volume, into a second position permitting gas to flow into the associated pneumatic chamber to increase the pressure therein upon a decrease of volume in the associated hydraulic chamber and into a third position permitting gas to pass from the associated pneumatic chamber to lower the pressure therein upon a decrease in volume in the associated hydraulic chamber.

15. The structure defined in claim 14 wherein the means for moving said valve mechanism includes a linkage operatively connected between the valve mechanism and the respective hydraulic chamber for sensing changes in volume in the hydraulic chamber.

References Cited in the file of this patent

UNITED STATES PATENTS

| | | |
|---|---|---|
| 2,537,637 | Candlin | Jan. 9, 1951 |
| 2,593,040 | Lloyd | Apr. 15, 1952 |
| 2,691,420 | Fox | Oct. 12, 1954 |
| 2,904,346 | Herbenar | Sept. 15, 1959 |
| 2,966,366 | Moulton | Dec. 27, 1960 |
| 3,014,714 | Trevaskis | Dec. 26, 1961 |
| 3,064,995 | Weller | Nov. 20, 1962 |

FOREIGN PATENTS

| | | |
|---|---|---|
| 468,320 | Germany | Nov. 10, 1928 |